(12) United States Patent
Nagashima et al.

(10) Patent No.: US 9,739,299 B2
(45) Date of Patent: Aug. 22, 2017

(54) COUPLING MEMBER, METHOD FOR PRODUCING COUPLING MEMBER, AND WOODEN MEMBER JOINT STRUCTURE

(71) Applicant: Sumitomo Forestry Co., Ltd., Tokyo (JP)

(72) Inventors: Taisuke Nagashima, Tokyo (JP); Takayuki Masuko, Tokyo (JP); Hiroki Kagei, Tokyo (JP); Hiroki Nakashima, Tokyo (JP)

(73) Assignee: Sumitomo Forestry Co., Ltd., Tokyo (JP)

( * ) Notice: Subject to any disclaimer, the term of this patent is extended or adjusted under 35 U.S.C. 154(b) by 200 days.

(21) Appl. No.: 14/450,518

(22) Filed: Aug. 4, 2014

(65) Prior Publication Data

US 2015/0043966 A1 Feb. 12, 2015

(30) Foreign Application Priority Data

Aug. 6, 2013 (JP) .................. 2013-163653

(51) Int. Cl.
*F16B 7/18* (2006.01)
*B23K 31/02* (2006.01)
(Continued)

(52) U.S. Cl.
CPC ............... *F16B 7/18* (2013.01); *B23K 20/12* (2013.01); *B23K 20/129* (2013.01); *B23K 31/02* (2013.01);
(Continued)

(58) Field of Classification Search
CPC ........ F16B 7/18; F16B 25/0015; B23K 28/02; B23K 31/02; B23K 20/12; B23K 20/129;
(Continued)

(56) References Cited

U.S. PATENT DOCUMENTS 3,999,339 A * 12/1976 Sappenfield .............. E06B 1/60
411/43
4,110,053 A * 8/1978 Buchholz ................ F16B 12/04
403/292
(Continued)

FOREIGN PATENT DOCUMENTS

| JP | 2007077611 A | 3/2007 |
|----|----|----|
| JP | 2013189762 A | 9/2013 |
| JP | 2013204228 A | 10/2013 |

*Primary Examiner* — James Ference
(74) *Attorney, Agent, or Firm* — The Webb Law Firm

(57) ABSTRACT

Disclosed is a coupling member that enables a joint between a wooden member and a mating member to absorb vibration energy, and a method for producing the same and a joint structure using the same. The metal coupling member is embedded in the wooden member. The wooden member is connected with a mating member by the coupling member. The coupling member includes a metal rod-like main body portion to be embedded in the wooden member, and an inner rod portion protruding from the main body portion. The inner rod portion axially extends from a protruding portion thereof to a predetermined depth in the main body portion, has a periphery separated from the main body portion to allow axial displacement of the inner rod portion relative to the main body portion, and is integrally connected to the main body portion at the deepest part thereof.

9 Claims, 15 Drawing Sheets

(51) Int. Cl.
*B23K 20/12* (2006.01)
*B23K 101/06* (2006.01)
*B23K 101/20* (2006.01)
*F16B 25/00* (2006.01)

(52) U.S. Cl.
CPC ...... *B23K 2201/06* (2013.01); *B23K 2201/20* (2013.01); *F16B 25/0015* (2013.01); *Y10T 403/68* (2015.01)

(58) Field of Classification Search
CPC ............ B23K 2201/06; B23K 2201/20; Y10T 403/68
See application file for complete search history.

(56) References Cited

U.S. PATENT DOCUMENTS

| | | | | |
|---|---|---|---|---|
| 4,118,910 A * | 10/1978 | McSherry | E04B 1/4114 | 411/80.5 |
| 5,582,496 A * | 12/1996 | Ambrico | F16B 39/12 | 411/243 |
| 5,823,701 A * | 10/1998 | Goto | E04B 1/2604 | 403/10 |
| 6,006,487 A * | 12/1999 | Leek | E04B 1/2604 | 403/190 |
| 6,036,397 A * | 3/2000 | Goto | F16B 11/006 | 403/265 |
| 6,120,207 A * | 9/2000 | Goto | F16B 11/006 | 403/230 |
| 6,200,061 B1 * | 3/2001 | Goto | E04B 1/2604 | 403/268 |
| 6,273,655 B1 * | 8/2001 | McAlpine | F16B 13/0841 | 411/34 |
| 6,295,773 B1 * | 10/2001 | Alty | E04F 13/0837 | 411/178 |
| 6,299,397 B1 * | 10/2001 | Mengel | F16B 5/0092 | 411/24 |
| 6,389,767 B1 * | 5/2002 | Lucey | E04B 1/24 | 52/223.1 |
| 6,453,634 B1 * | 9/2002 | Pryor | E04B 1/26 | 52/285.2 |
| 6,513,290 B2 * | 2/2003 | Leek | E04B 1/2604 | 403/232.1 |
| 6,550,200 B1 * | 4/2003 | Mueller | E04B 1/26 | 403/190 |
| 6,560,940 B2 * | 5/2003 | Mueller | E04B 1/2604 | 411/536 |
| 6,625,945 B2 * | 9/2003 | Commins | E04B 1/2604 | 52/293.3 |
| 6,662,511 B1 * | 12/2003 | Alty | E04F 13/0837 | 411/178 |
| 7,150,132 B2 * | 12/2006 | Commins | E04B 1/26 | 411/536 |
| 8,337,112 B2 * | 12/2012 | Kauppila | E04B 1/486 | 29/525.02 |
| 8,397,442 B2 * | 3/2013 | Laurin | E02D 27/32 | 52/126.6 |
| 8,419,333 B2 * | 4/2013 | Wray | F16B 13/124 | 411/424 |
| 2001/0009638 A1 * | 7/2001 | Crawford | E04C 3/16 | 411/387.2 |
| 2003/0009964 A1 * | 1/2003 | Trarup | E02D 27/32 | 52/295 |
| 2003/0230032 A1 * | 12/2003 | Shahnazarian | E04H 9/14 | 52/167.3 |
| 2005/0193681 A1 * | 9/2005 | Brackett | E04H 9/028 | 52/698 |
| 2005/0204643 A1 * | 9/2005 | Suehiro | F16B 5/02 | 52/27 |
| 2006/0104742 A1 * | 5/2006 | Fleming | F16B 5/0275 | 411/389 |
| 2007/0022704 A1 * | 2/2007 | Pryor | E04G 23/0218 | 52/712 |
| 2007/0110513 A1 * | 5/2007 | Fujihashi | E04B 1/2403 | 403/364 |
| 2007/0125036 A1 * | 6/2007 | Schloemer | E04B 1/762 | 52/698 |
| 2009/0074538 A1 * | 3/2009 | Richie | F16B 13/065 | 411/516 |
| 2009/0094916 A1 * | 4/2009 | Crumley | E04H 9/14 | 52/293.3 |
| 2009/0123251 A1 * | 5/2009 | Dubon | F16B 19/125 | 411/20 |
| 2010/0229495 A1 * | 9/2010 | Gridley | E02D 27/10 | 52/705 |
| 2011/0107699 A1 * | 5/2011 | Kawai | E04B 1/24 | 52/393 |
| 2015/0043966 A1 * | 2/2015 | Nagashima | F16B 7/18 | 403/343 |

* cited by examiner

FIG. 5A
FIG. 5B
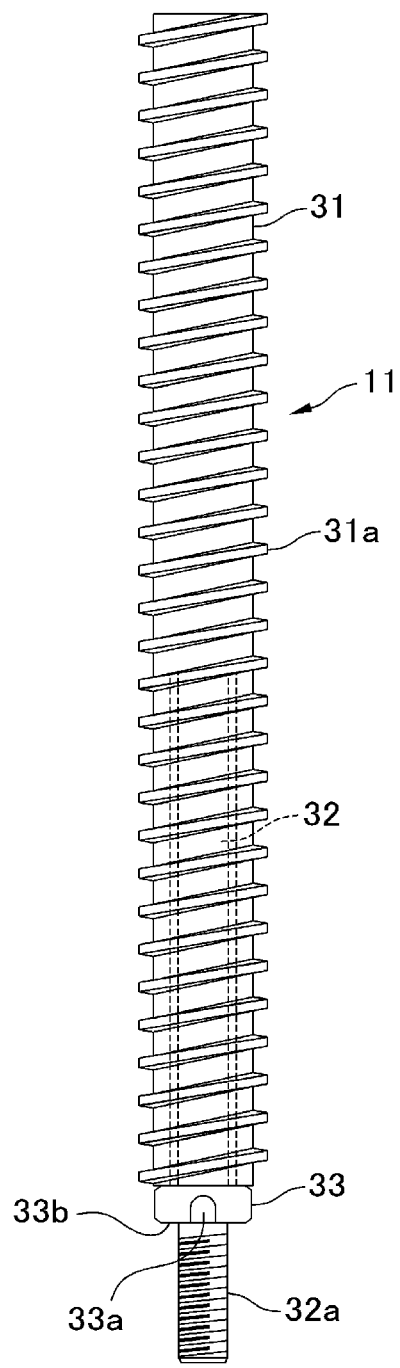
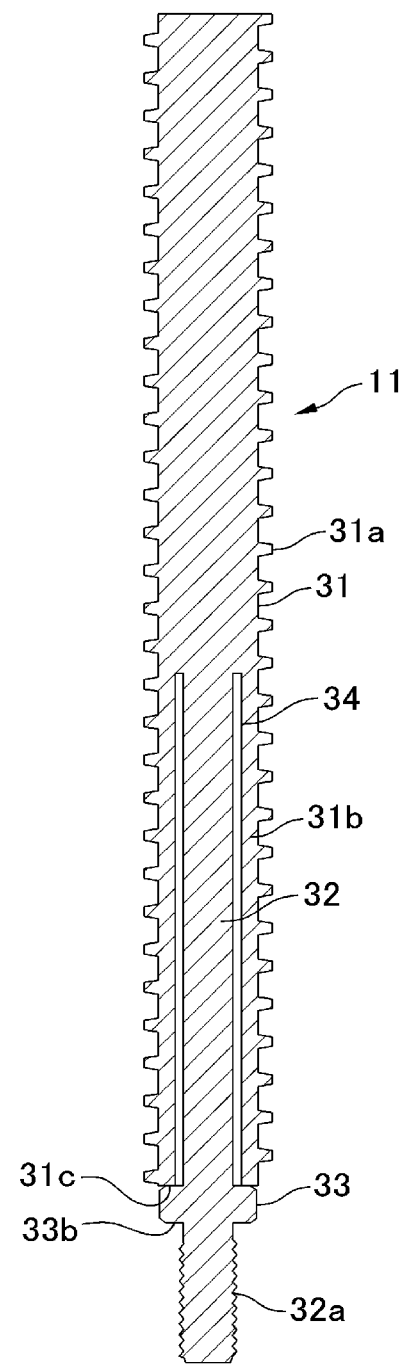

Prior Art

COUPLING MEMBER, METHOD FOR PRODUCING COUPLING MEMBER, AND WOODEN MEMBER JOINT STRUCTURE

CROSS REFERENCE TO RELATED APPLICATION

This application claims priority to Japanese Patent Application No. 2013-163653 filed Aug. 6, 2013, the disclosure of which is hereby incorporated in its entirety by reference.

BACKGROUND OF THE INVENTION

1. Technical Field

The present invention relates to a coupling member that is used to join a wooden column to a mating member, such as a wooden beam or foundation, in a wooden building, a method for producing the coupling member, and a wooden member joint structure using the coupling member.

2. Related Art

It has been suggested to join wooden columns and wooden beams or wooden columns and the foundation by means of so-called rigid joints that allow the transmission of a bending moment therebetween to form a structural skeleton having a rigid-frame structure in a wooden building. In such a structure, when a horizontal force is applied to the structural skeleton, a bending moment acts on the joints between columns and beams or joints between columns and the foundation. When horizontal forces in opposite directions are repeatedly applied as in the case of an earthquake, bending moments in opposite directions are applied repeatedly and alternately to the joints between columns and beams or joints between columns and the foundation. The joints must have sufficient strength against such bending moments.

A joint structure for a rigid-frame structure using wooden columns is disclosed in Patent Literature 1, for example.

In this joint structure, each wooden column is joined to the foundation at two points via joint devices at a lower end thereof. Each of the joints has the following configuration.

As shown in FIG. 15, a screw member 122 is axially threaded into a lower end of a wooden column 121, and the screw member 122 has a hollow hole axially extending from an end face thereof. A joint bolt 123 is inserted into the hollow hole, and the upper end of the joint bolt 123 is threaded into the bottom of the hollow hole. The upper end of the joint bolt 123 is coupled to the screw member 122 in this way, and the lower end of the joint bolt 123 is coupled to a joint device 125 coupled to a foundation 124. Specifically, an intermediate nut 126 and a fastening nut 127 are threadedly mounted on a male thread portion 123a formed at the lower end of the joint bolt 123, and the joint device 125 is fixedly interposed between the intermediate nut 126, which has been tightened until it is in pressure contact with an end face of the screw member 122, and the fastening nut 127.

Two joints each using a screw member 122 and a joint device 125 as described above are provided at two locations at the lower end of the column 121, in other words, at both ends in the long-side (longitudinal) direction of the cross-section of the column having a flat rectangular cross-section. The joints bear a tensile force and a compressive force, respectively, to resist a bending moment.

In the above joint structure, when a large bending moment acts to a lower end of the column 121, an upward pulling force is applied to the screw member 122 in the position where one of the screw members 122 is threaded into the wooden column 121 and a tensile force acts to the joint bolt 123 threadedly inserted into the hollow hole of the screw member 122. On the other hand, a compressive force acts between the other screw member (not shown) and joint device via the intermediate nut. The joint bolt 123 to which a tensile force acts undergoes elongation in such a way that it is pulled out of the hollow hole of the screw member 122, and undergoes plastic deformation under tensile stress when the elongation exceeds its elastic limit. After that, when a bending moment in the opposite direction is generated, a force acts (the column 121 is deformed) in such a direction that the lower end of the column 121 is pressed against the joint device 125, and a compressive force acts to the joint bolt 123, which has undergone plastic deformation under tensile stress. In other words, the upper surface of the joint device 125 is pressed against the intermediate nut 126, and a compressive force acts to press the joint bolt 123 into the hollow hole of the screw member 122, whereby the intermediate nut 126 is returned to its original position where it abuts against the screw member 122.

In this way, in the above joint structure, the column 121 can be kept joined to the foundation 124 via the joint device 125 even when bending moments in opposite directions act repeatedly and alternately to the joint.

[Patent Literature 1] JP-A-2007-077611

In the joint structure disclosed in Patent Literature 1, even when bending moments in opposite directions are repeatedly applied to the joint as described above, the joint between the column 121 and the foundation 124 can be maintained and the energy of earthquake motion can be absorbed by plastic deformation of the joint bolt 123.

However, the joint structure has the following problem desired to be solved in terms of the screw member 122 and the joint bolt 123.

When horizontal forces are repeatedly applied to the joint and the joint bolt 123 undergoes plastic deformation in the tensile direction as in the case of an earthquake, the male thread portion threadedly engaged with the screw member 122 also undergoes plastic deformation in the tensile direction. There is a small play between the female thread portion formed in the bottom of the hollow hole of the screw member 122 and the male thread portion of the joint bolt 123 because of dimensional tolerances, and the screw member 122 and the joint bolt 123 can slightly wobble relative to each other. When the joint bolt 123 undergoes plastic deformation in the tensile direction, the play between them increases. When the screw member 122 and the joint bolt 123 are displaced relative to each other because of the play, the ability of the joint bolt 123 to absorb vibrational energy in the event of an earthquake decreases. Where, the ability is created as the joint bolt 123 alternately undergoes plastic deformation in the tensile direction and plastic deformation in the compressive direction.

In addition, because the angle between the axes of the female thread portion in the hollow hole of the screw member 122 and the male thread portion of the joint bolt 123 becomes likely to change, the joint bolt 123 becomes likely to undergo buckling when a compressive force is applied thereto. In other words, because the restriction on a change in the angle of the tip of the joint bolt 123 is relaxed and the buckling length of the joint bolt 123 therefore increases, the joint bolt 123 can undergo buckling under a lower load. The ability of the joint bolt 123 to absorb vibrational energy in the event of an earthquake also decreases when the joint bolt 123 undergoes buckling in the hollow hole of the screw member 122 as described above.

In addition, the screw member 122 and the joint bolt 123, the joint bolt 123 and the intermediate nut 126, and the joint bolt 123 and the fastening nut 127 are threadedly engaged with each other, these members are desired to be assembled in such a manner that no looseness will develop between them.

The present invention has been made in view of the above circumstances, and it is, therefore, an object of the present invention to provide a coupling member that enables the joint between a wooden member and a mating member to absorb vibration energy effectively, a method for producing the coupling member, and a wooden member joint structure using the coupling member.

SUMMARY OF THE INVENTION

To solve the problem, the invention according to Aspect 1 provides a coupling member, comprising: a metal rod-like main body portion to be embedded and held in an wooden member; and an inner rod portion protruding from an end face of the main body portion and to be coupled to a mating member, the mating member being to be joined to the wooden member or the inner rod portion being to be coupled to a joint device secured to the mating member, wherein the inner rod portion axially extends from a protruding portion thereof to a predetermined depth in the main body portion, has a periphery separated from the main body portion to allow axial displacement of the inner rod portion relative to the main body portion, and is integrally connected to the main body portion at the deepest part thereof.

It is generally known that a structural body is tougher and more robust when it can tolerate a larger amount of deformation, in other words, undergo plastic deformation to a larger extent, before it reaches final failure. In particular, a statically indeterminate structure, such as a rigid-frame structure, has improved resistance to final failure when each part of the structural body can tolerate significant plastic deformation, because redistribution of bending moment occurs when a large load acts to cause a part of its structural skeleton to undergo plastic deformation. In addition, even when cyclic load (vibration) is applied as in the case of an earthquake, a statically indeterminate structure has improved safety against final fracture because vibration energy is absorbed and vibration is attenuated when it undergoes plastic deformation.

When a wooden member and a mating member is joined to each other using the coupling member of the present invention, a force acts to pull the inner rod portion of the joint out of the hole extending axially in the main body portion and tensile stress acts to the inner rod portion when a force that acts to separate the wooden member and the mating member is applied to the joint therebetween. Then, the inner rod portion undergoes elongation, and it undergoes plastic deformation and tolerates large deformation before final failure when the tensile stress greater than its yield point stress is applied thereto. Thus, a tough and robust structure can be achieved.

When the direction of the load is reversed and a force acts to press the wooden member against the mating member, a force that acts to press the inner rod portion into the hole, in other words, a compressive force, is allowed to act on the inner rod portion to generate compressive strain in the inner rod portion, which has undergone plastic deformation under tensile stress. The vibration energy can be absorbed by the plastic deformation of the inner rod portion. At this time, because the inner rod portion is integrally connected to the main body portion of the coupling member, there is no possibility that a looseness or relative displacement occurs between the inner rod portion and the main body portion, and the vibration energy can be effectively absorbed by plastic deformation of the inner rod portion.

The invention according to Aspect 2 is the coupling member according to Aspect 1, wherein the inner rod portion is formed by inserting a shaft member produced separately from the main body portion into a hole formed axially in the main body portion from the end face thereof, heating a tip of the shaft member inserted into the hole and a bottom of the hole, and pressing and welding the shaft member to the bottom of the hole to join the tip of the shaft member with the bottom of the hole of the main body portion.

In this coupling member, even when the inner rod portion and the main body portion surrounding the inner rod portion are separated over a wide range because the hole formed in the main body portion is deep, a structure in which the inner rod portion is integrally connected to the main body portion at the bottom of the hole can be realized.

The invention according to Aspect 3 is the coupling member according to Aspect 1, wherein the inner rod portion has a flange formed integrally with the protruding portion thereof, the flange extending perpendicular to an axis of the inner rod portion, and wherein the flange is in pressure contact with the end face of the main body portion.

In this coupling member, when the direction of the load is reversed and a force acts to press the wooden member against the mating member after the inner rod portion undergoes plastic deformation under a tensile force, a compressive force is allowed to act on the inner rod portion from the mating member or joint device via the flange. Then, because the flange is in pressure contact with the main body portion, the compressive force that acts between the wooden member and the mating member can be transmitted from the mating member via the flange to the main body portion.

In addition, because the flange is in pressure contact with the end face of the main body portion, the hole formed in the main body portion is closed by the flange and the generation of rust in the hole can be prevented.

The invention according to Aspect 4 is the coupling member according to Aspect 3, wherein the inner rod portion is formed by producing a shaft member having the flange, the shaft member being produced separately from the main body portion, inserting the shaft member into a hole formed axially in the main body portion from the end face thereof, heating a tip of the shaft member inserted into the hole and the bottom of the hole with the flange separated from the end face of the main body portion, pressing the tip of the shaft member to the bottom of the hole in the main body portion until the flange comes into contact with the end face of the main body portion, welding and cooling the shaft member and the main body portion to join them.

In this coupling member, the tip of the shaft member and the bottom of the hole in the main body portion can be joined to each other by heating them and then pressing them firmly together. In addition, because the shaft member becomes hotter than the main body portion surrounding it during heating, when the main body portion and the shaft member are cooled after they are pressed against each other, in other words, with the end face of the main body portion and the flange of the shaft member in contact with each other, the shaft member contracts more significantly than the main body portion surrounding it and the flange is further pressed against the end face of the main body portion.

The invention according to Aspect 5 is the coupling member according to Aspect 2 or 4, wherein a raised portion protruding axially from the deepest part of the hole toward an opening of the hole and separated from the inner periphery of the hole is provided in the hole formed in the main body portion, and wherein the inner rod portion is formed by joining the tip of the shaft member to the raised portion.

In this coupling member, the raised portion protruding from the bottom of the hole formed in the main body portion can be heated and joined to the tip of the shaft member, also heated, by welding. At this time, because only the tip of the shaft member and the raised portion to be joined to the tip of the shaft member have to be heated to a sufficient temperature for welding, the temperature rise of the region in the vicinity of the bottom of the hole at which the cross-section of the main body portion sharply changes can be curbed. As a result, the generation of temperature stress and the generation of cracks in the main body portion during cooling due to temperature non-uniformity in the main body portion can be less.

The invention according to Aspect 6 is the coupling member according to any one of Aspects 2, 4 or 5 wherein the tip of the shaft member has a convex or concave conical surface having a central axis coincident with that of the shaft member, and the bottom of the hole formed in the main body portion or the raised portion formed on the bottom of the hole has a concave or convex conical surface having generally the same inclination as that of the convex or concave conical surface of the tip of the shaft member.

In this coupling member, when the bottom of the hole of the main body portion and the tip of the shaft member are joined by pressing them together after heating, the main body portion and the shaft member are guided by their conical surfaces to a position where their central axes are coincident with each other. Thus, the main body portion and the inner rod portion can be joined with their central axes generally coincident with each other.

The invention according to Aspect 7 provides a method for producing a coupling member, comprising the steps of: forming a hole in a metal rod-like main body portion axially to a predetermined depth from an end face thereof; preparing a shaft member having a diameter that allows axial displacement of the shaft member in the hole relative to the main body portion and having a flange formed integrally with an intermediate portion between both ends of the shaft member, and inserting one end of the shaft member with respect to the flange into the hole; heating a tip of the shaft member inserted into the hole and a bottom of the hole with the flange separated from the end face of the main body portion; and pressing the flange to the end face of the main body portion to join the tip of the shaft member to the bottom of the hole in the main body portion by welding and cooling the shaft member and the main body portion.

In this method for producing a coupling member, the tip of the shaft member and the bottom of the hole in the main body portion can be joined to each other by heating them and then pressing them firmly together. In addition, because the shaft member becomes hotter than the main body portion surrounding it during heating, when it is cooled while the main body portion and the shaft member are pressed against each other and the end face of the main body portion and the flange of the shaft member come in contact with each other, the shaft member contracts more significantly than the main body portion surrounding it and the flange is further pressed against the end face of the main body portion.

The invention according to Aspect 8 provides a wooden member joint structure, comprising a coupling member according to any one of claims 1 to 6, a wooden member in which the coupling member is fixedly embedded; and a mating member joined to the wooden member by the coupling member.

In this wooden member joint structure, when a force that acts to separate the wooden member and the mating member from each other and a force that acts to press the wooden member and the mating member against each other are repeatedly applied to the joint therebetween, the inner rod portion undergoes plastic deformation when it receives a tensile stress greater than its yield point stress, and the amount of energy that the inner rod portion can absorb, which depends on the history of the relationship between its displacement and the force applied to it, increases. In other words, because the inner rod portion is integrally connected to the main body portion of the coupling member, there is no possibility that a looseness or relative displacement occurs between the inner rod portion and the main body portion, and energy can be effectively absorbed by plastic deformation of the inner rod portion. Thus, a tough and robust structure can be achieved.

Effect of the Invention

As described above, when the coupling member according to the present invention is used, a tough building structure can be realized and development of looseness in the joints between wooden members and a decrease in the amount of energy that the joints can absorb can be curbed because the amount of plastic deformation that joints between wooden members can undergo before breakage increases.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the patent claims constitute, therefore, a part of the present invention in the sense of doctrine of equivalents.

BRIEF DESCRIPTION OF THE DRAWINGS

FIG. 5A shows a side view of the coupling member according to one embodiment of the present invention used in the joint structure shown in FIG. 2 and FIG. 3.

FIG. 5B shows a cross-sectional view of the coupling member as shown in FIG. 5A according to one embodiment of the present invention used in the joint structure shown in FIG. 2 and FIG. 3.

DETAILED DESCRIPTION OF THE PREFERRED EMBODIMENT

Description is hereinafter made of embodiments of the present invention with reference to the drawings.

Figure 1:
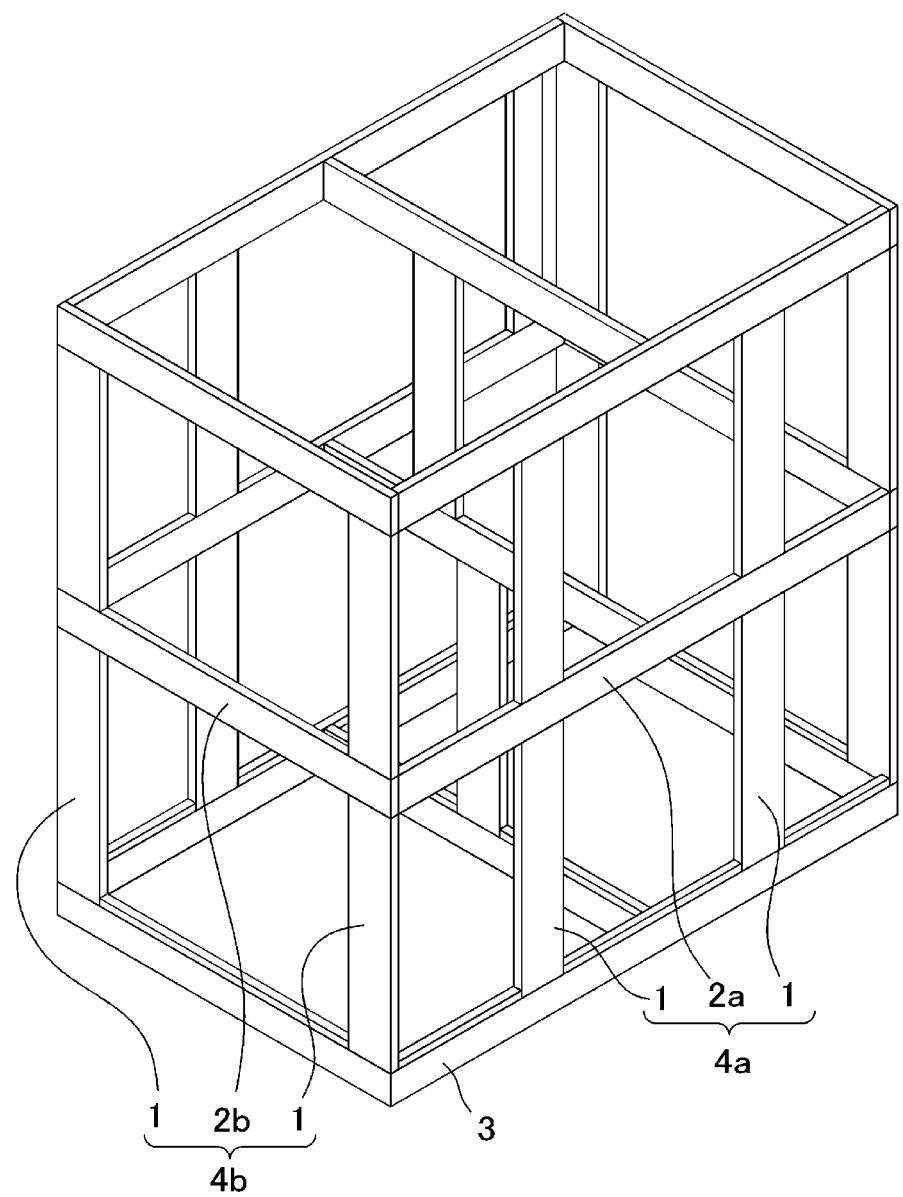
FIG. 1 is a schematic perspective view illustrating a structural skeleton of a wooden building constructed using coupling members according to the embodiment of present invention.

FIG. 1 is a schematic perspective view illustrating an example of a structural skeleton of a wooden building in which coupling members of the embodiment of present invention can be used.

This structural skeleton has rigid-frame bodies 4 each formed by joining wooden columns 1 and a wooden beam 2, and the wooden columns 1 to a foundation 3 enabling bending moments to transmit therebetween. The structural skeleton is formed by combining a plurality of rigid-frame bodies 4 on a concrete foundation 3. Each rigid-frame body 4 has so-called a beam-priority structure in which a wooden beam 2 is mounted on and joined to wooden columns 1. Each column 1 of each rigid-frame body 4 has a flat rectangular cross-section with a longer side extending in the axial direction of the beam 2 supported thereon and a shorter side extending in a direction perpendicular to the axis of the beam 2. The beam 2 also has a flat rectangular cross-section which is longer in a vertical direction and shorter in a horizontal direction. Thus, the joint between the column 1 and the beam 2 in each rigid-frame body has a structure which can resist bending in one direction which produces compressive stress and tensile stress in the direction of the longer sides of their cross-sections. A first rigid-frame body 4a and a second rigid-frame body 4b are joined to each other with an end face of the beam 2a of the first rigid-frame body 4a abutting against a side of the beam 2b of the second rigid-frame body 4b to form a three-dimensional rigid-frame structure.

Figure 2:
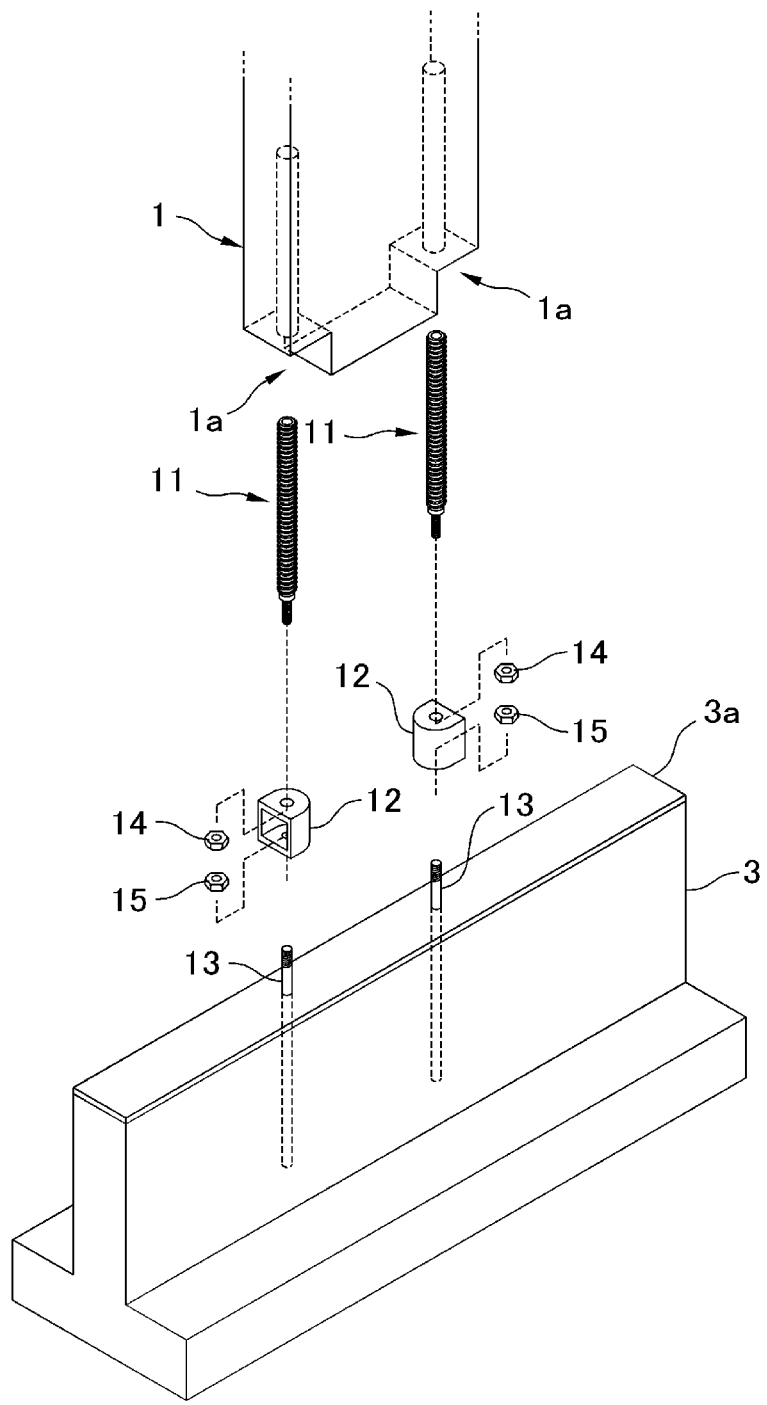
FIG. 2 is an exploded perspective view illustrating a joint structure between a lower end of a column and the foundation of the structural skeleton shown in FIG. 1.
Figure 3:
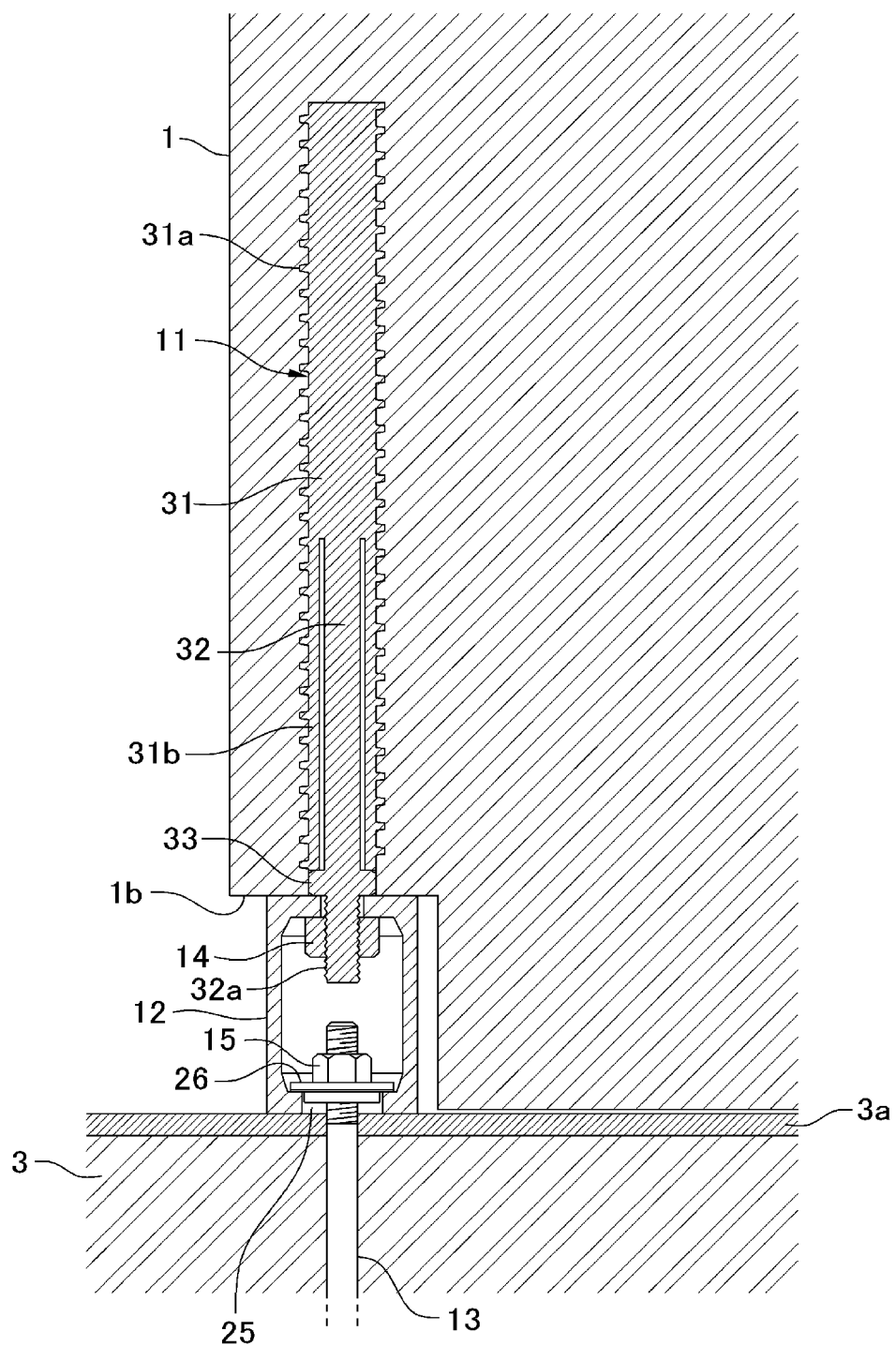
FIG. 3 is an enlarged cross-sectional view of the joint structure shown in FIG. 2, illustrating a cross-section parallel to the axis of a rigid-frame body.

FIG. 2 is an exploded perspective view illustrating a wooden member joint structure as one embodiment of the present invention. FIG. 3 is an enlarged cross-sectional view of the same joint structure, illustrating a cross-section parallel to the axis of the rigid frame body.

In this joint structure, the column 1 has cutouts 1a at both ends in the longer side direction at the lower end thereof, and a coupling member 11 is axially threaded into the column 1 from each cutout 1a. A joint device 12 is installed in each cutout 1a, and the coupling member 11 and the joint device 12 are coupled by means of a fastening nut 14.

Anchor bolts 13 are vertically embedded in the foundation 3 at positions corresponding to the positions where the coupling members 11 are threaded into the column 1 with their heads protruding from the upper surface of the foundation 3. The joint devices 12 are secured to the foundation 3 by means of nuts 15 threadedly mounted on the anchor bolts 13. The foundation 3 and the column 1 are therefore joined to each other via the anchor bolts 13, the joint devices 12 and the coupling members 11.

The foundation 3 has a concrete wall portion having an upper surface finished flat with a primer 3a. The joint devices 12 are placed on the surface finished flat with the primer 3a and fixed by means of the anchor bolts 13.

The primer contains mortar or plaster, for example, and can be casted in a highly fluent state and cured. A material called leveler or self-leveling material can be used as the primer.

Figure 4:
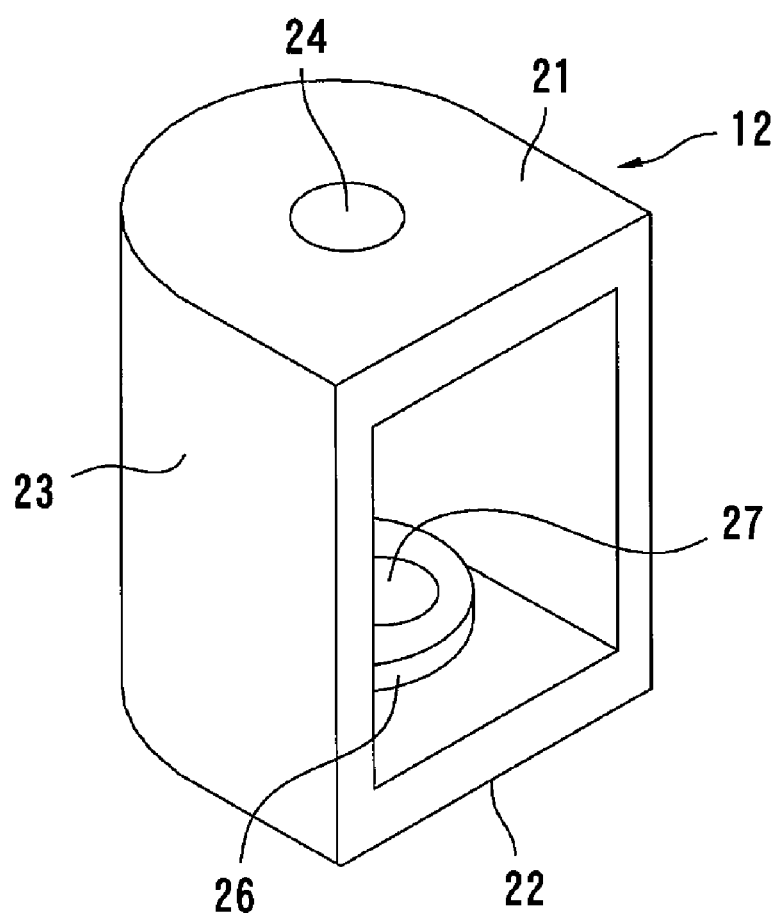
FIG. 4 is a perspective view of a joint device used in the joint structure shown in FIG. 2 and FIG. 3.

As shown in FIG. 4, the joint device 12 has two horizontal plate portions 21 and 22 facing each other and a side plate portion 23 connecting the horizontal plate portions 21 and 22, and the side plate portion 23 is provided in such a manner that an opening is formed between the horizontal plate portions 21 and 22 along part of the circumferences thereof.

The upper horizontal plate portion 21 has a through hole 24 that is used in coupling the joint device 12 to a coupling member 11 embedded in the column 1. The lower horizontal plate portion 22 is in contact with the upper surface of the foundation 3, and is fixed to the foundation 3 by means of an anchor bolt 13 having a lower end embedded in the foundation 3 and a nut 15 threadedly mounted on the anchor bolt.

The lower horizontal plate portion 22 has a circular hole 25, and a circular plate 26 is fitted in and engaged with the circular hole 25 from the inside of the joint device 12 having a box-like configuration. The circular plate 26 is circumferentially rotatable in the circular hole 25. The circular plate 26 has a slot 27 through which the anchor bolt 13 can extend, and the slot 27 has an axis extending radially from the center of the circular plate 26. Thus, by rotating the circular plate to adjust the direction of the axis of the slot 27, the relative positions of the anchor bolt 13 and the joint device 12 can be adjusted so that the column 1 can be easily erected at a predetermined position.

The joint device 12 is preferably set not to undergo large deformation or not to fracture before the coupling member 11 and the joint bolt 13 is broken when a tensile force or compressive force is applied thereto from the column 1, and the thickness of each part of the joint device 12 and the material of the joint device 12 should be suitably selected so that the joint device 12 has sufficient strength and rigidity.

As shown in FIG. 5A and FIG. 5B, the coupling member 11 has a main body portion 31 having a spiral protrusion 31a on an outer periphery thereof, an inner rod portion 32 provided to protrude from one end face of the main body portion, and a flange 33 formed integrally with the inner rod portion.

The main body portion 31 is a portion that is fixedly threaded into a hole formed in a wooden member. Because the spiral protrusion 31a is engaged with the wooden member, the main body portion 31 produces a strong resisting force against a force that acts to pull it out of the wooden member.

The inner rod portion 32 is provided along the central axis of the main body portion 31. The inner rod portion 32 has a portion extending axially from one end face 31c of the main body portion 31 to a predetermined depth and separated from the main body portion 31 to allow axial displacement of the inner rod portion 32 relative to the main body portion 31. In other words, an annular gap 34 is formed between the inner rod portion 32 and a circumferential portion 31b of the main body portion 31, and the inner rod portion 32 is formed in a hole axially formed in the main body portion 31. The inner rod portion 32 is integrally connected to the main body portion 31 at the deepest part of the hole. On the other hand, the opposite end of the inner rod portion 32 protrudes from the end face 31c of the main body portion 31, and has an end portion with a male thread formed thereon. The male thread portion 32a of the inner rod portion protruding as described above can be joined to a joint device 12 by inserting it through the through hole 24 formed through the upper horizontal plate portion 21 of the joint device 12 and fastening a fastening nut 14 threadedly mounted thereon.

The flange 33 is formed integrally and continuously with the inner rod portion 32, and extends outward from the circumference of a portion of the inner rod portion 32 exposed from the hole formed in the main body portion 31 to form a flange-like configuration, and has a face facing the end face 31c of the main body portion 31 and in close contact therewith. The flange 33 has a plurality of cutouts 33a formed in its face from which the inner rod portion protrudes so that a tool can be engaged with the cutouts 33a to rotate the flange 33 about the axis of the main body portion 31. Thus, the coupling member 11 can be threaded into the hole formed in a wooden column 1 and fixed with, as shown in FIG. 3, the face 33b of the flange 33 from which the inner rod portion protrudes being generally flush with a face 1b in a cutout of the column 1 shown in FIG. 3.

The inner rod portion 32 of the coupling member 11 is preferably formed of a material which undergoes large plastic deformation before breakage, such as a soft steel, and its diameter can be set based on the location where the joint structure will be provided in a structural body, the dimensions of the members that constitute the structural body, and so on.

A coupling member 11 that is produced as described below, for example, can be used.

Figure 6A:
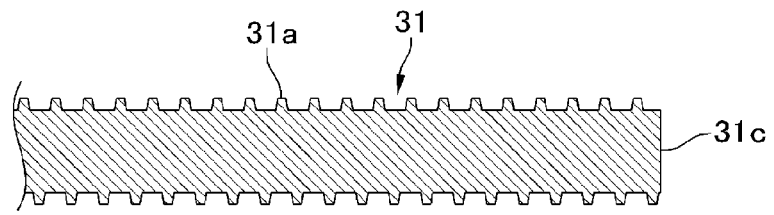
FIG. 6A shows a partial cross-sectional view illustrating a step of method for producing the coupling member shown in FIG. 5B.
Figure 6B:
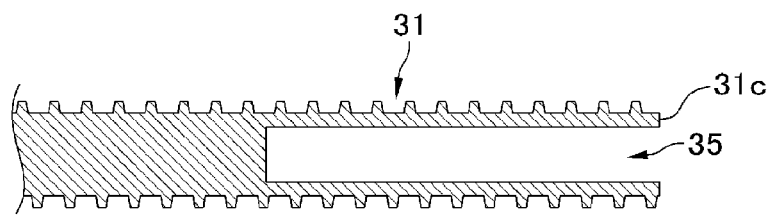
FIG. 6B shows a partial cross-sectional view illustrating a step of method for producing the coupling member shown in FIG. 5B.
Figure 6C:
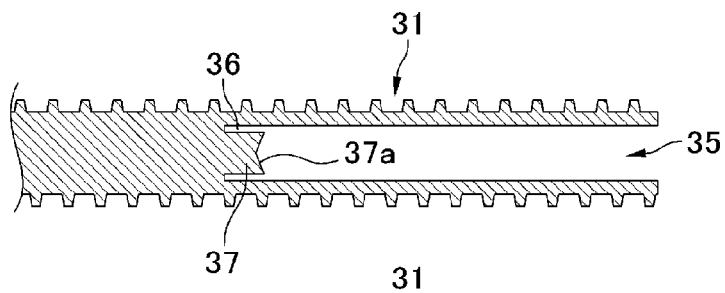
FIG. 6C shows a partial cross-sectional view illustrating a step of method for producing the coupling member shown in FIG. 5B.

As shown in FIG. 6A, a rod-like steel material is cut to form a main body portion 31 with a solid cross-section having a spiral protrusion 31a around it. Then, as shown in FIG. 6B, a hole 35 is axially formed in the main body portion 31 from one end face 31c thereof. The hole may be formed by machining or machine-cutting. After the hole is formed to a predetermined depth, a part of the main body portion 31 along the inner periphery of the hole 35 is further cut to form an annular groove 36 in the bottom of the hole as shown in FIG. 6C. As a result, a raised portion 37 that will be a part of the inner rod portion 32 protrudes from the bottom of the groove 36. The tip 37a of the raised portion is cut to form a concave conical surface having a central axis generally coincident with that of the main body portion 31.

On the other hand, a rod-like shaft member 38, which will be the inner rod portion 32, is produced separately, and a convex conical surface having generally the same inclination as that of the concave conical surface of the main body portion 31 is formed at a tip of the shaft member 38. A flange 33 is preliminarily formed on the shaft member 38. The length of a first portion 38a of the shaft member 38 on one side with respect to the flange 33 is determined based on the depth of the hole 35 formed in the main body portion 31, and a second portion 38b of the shaft member 38 on the opposite side with respect to the flange 33 has a sufficient length to be coupled to a mating member and a male thread formed thereon.

Figure 6D:
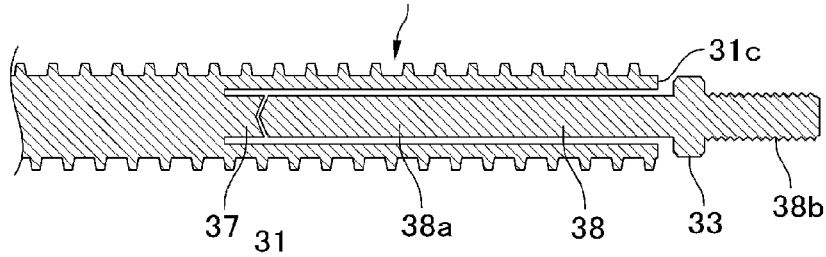
FIG. 6D shows a partial cross-sectional view illustrating a step of method for producing the coupling member shown in FIG. 5B.

As shown in FIG. 6D, the first portion 38a of the shaft member 38 on one side with respect to the flange 33 is inserted into the hole 35 formed in the main body portion 31 to get its tip face to face with the raised portion 37 in the hole 35. At this time, the flange 33 is maintained at a predetermined distance from the end face 31c of the main body portion 31.

Figure 6E:
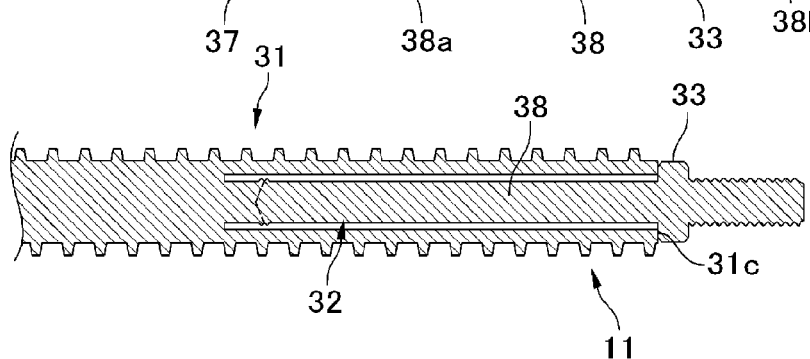
FIG. 6E shows a partial cross-sectional view illustrating a step of method for producing the coupling member shown in FIG. 5B.

Then, with the tip of the shaft member 38 and the raised portion 37 formed in the hole 35 of the main body portion 31 facing each other, the mating surfaces are heated and welded together. The heating and welding may be accomplished by, for example, a method which utilizes the heat that is generated by the electrical resistance of the contact surfaces when electric current is applied thereto while the faces to be welded abut against each other, a method in which a gap is maintained between the welding surfaces and arc discharge is produced to heat them, a method in which the main body portion 31 or the shaft member 38 is rotated at a high speed with the welding surfaces in contact with each other to generate heat using frictional heat. Then, the tip of the shaft member 38 and the raised portion 37 in the hole 35 of the main body portion 31 are pressed against each other while they are still hot and the shaft member 38 is forced into the hole 35 until the flange 33 comes into contact with the end face 31c of the main body portion 31 as shown in FIG. 6E. When cooling is carried out in this state, the inner rod portion 32 is integrally connected to the bottom of the hole 35 formed in the main body portion 31. As a result, a coupling member 11 having an inner rod portion 32 protruding from one end face 31c of the main body portion 31 can be obtained.

When the tip of the shaft member 38 and the raised portion 37 in the hole 35 of the main body portion 31 are heated and pressed against each other, the shaft member 38 is hotter than the circumferential portion 31b of the main body portion, which is located around the shaft member 38. Thus, when cooled, the portion of the shaft member 38 from the tip to the flange 33 contracts axially to a greater extent than the corresponding portion of the main body portion 31. As a result, the flange 33 is brought into close contact with the end face 31c of the main body portion 31 and closes the hole 35 formed in the main body portion 31.

Figure 7:
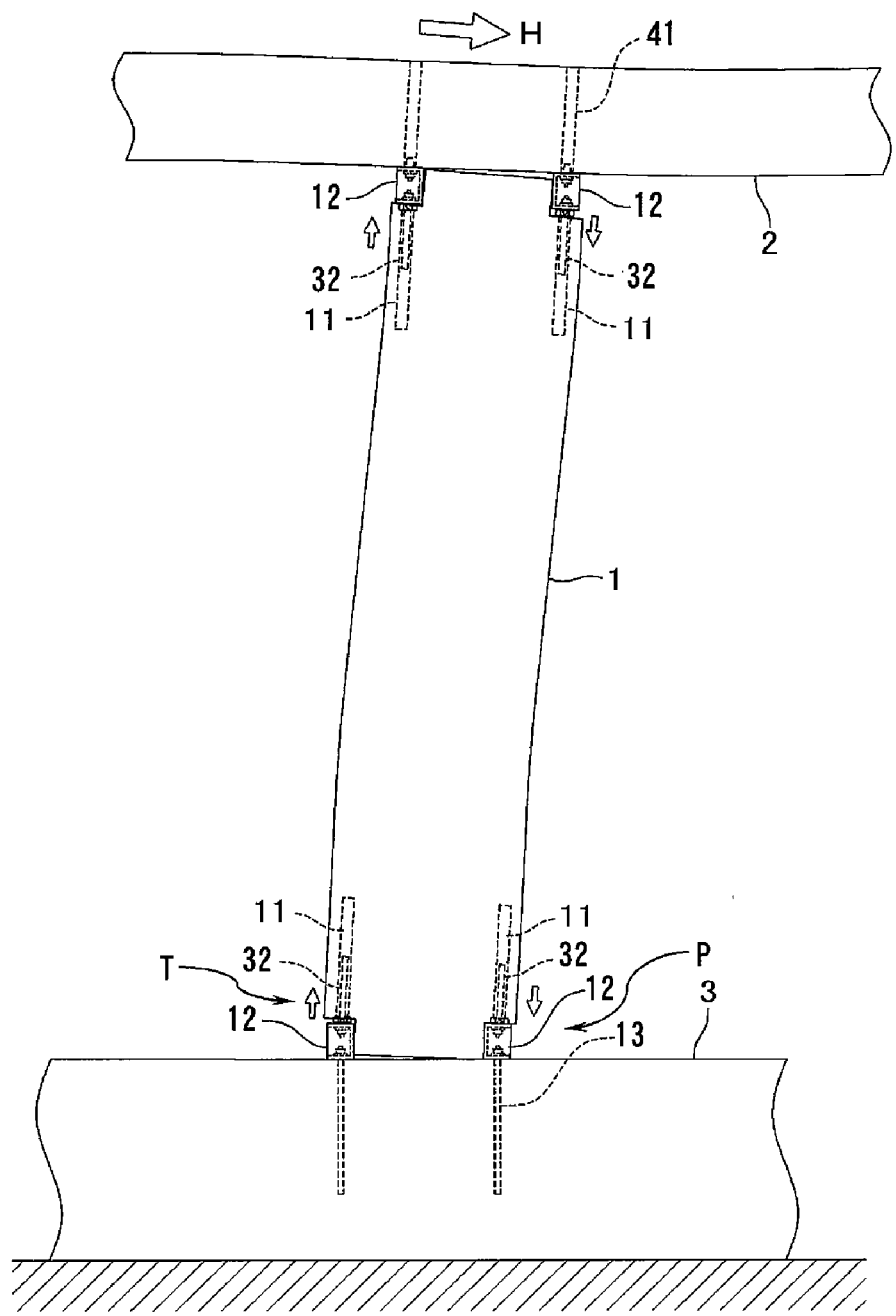
FIG. 7 is a schematic view illustrating a manner of deformation of a column joined to a foundation by means of the joint structure shown in FIG. 2 and FIG. 3.

When a bending moment is applied to a lower end of a column 1 joined to the foundation 3 via the coupling members 11, the joint devices 12 and the anchor bolts 13 as described above, an upward pulling force is applied to the coupling member 11 on the tension side T as shown in FIG. 7. At this time, the fastening nut 14 threadedly mounted on the inner rod portion 32 of the coupling member 11 is engaged with the joint device 12 fixed to the foundation 3 and is therefore restrained from displacement. Thus, a tensile force is applied to the inner rod portion 32 and a force acts to separate the flange 33 from the end face of the coupling member 11. On the other hand, on the compression side P, a compressive force acts from the column 1 via the main body portion 31 and the flange 33 of the coupling member 11 to the joint device 12 and is supported by the foundation 3.

Figure 8:
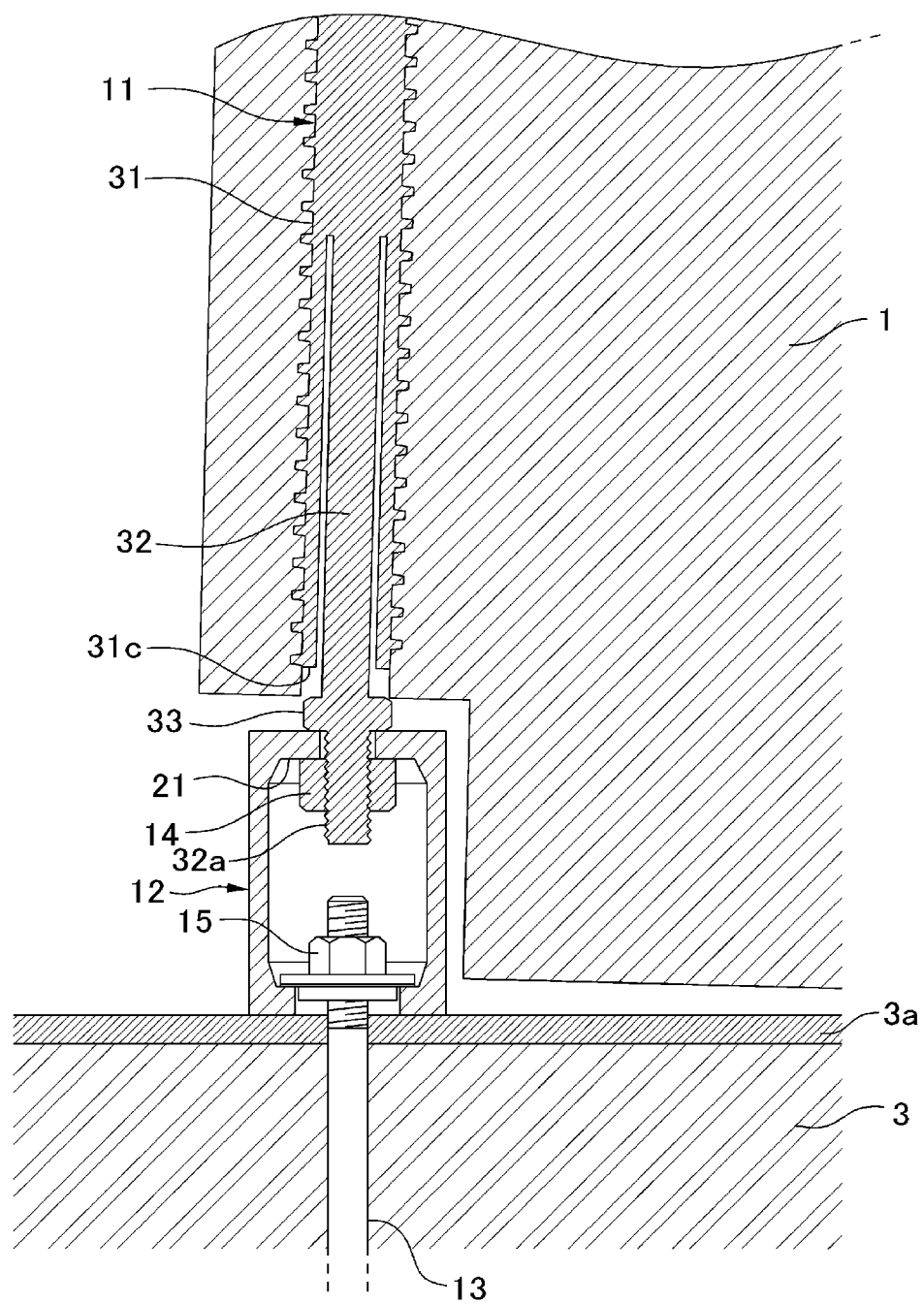
FIG. 8 is an enlarged cross-sectional view illustrating how the joint structure between the column and the foundation behaves when the column is deformed as shown in FIG. 7.

While the upward pulling force that is applied to the coupling member 11 on the tension side T is lower than the compressive force preliminarily applied between the flange 33 and the end face 31c of the main body portion 31, the flange 33 is held in contact with the end face 31c of the main body portion 31. Then, when the compressive force (abutting force) disappears and a stronger upward pulling force acts to separate the flange 33 from the end face 31c of the main body portion 31, the flange 33 is separated from the end face 31c of the main body portion 31 and the inner rod portion 32 is slightly pulled out of the hole 35 in the main body portion 31 as shown in FIG. 8. In other words, the deformation of the joint that occurs under an initial load that is applied thereto until the compressive force acting between the end face 31c of the main body portion and the flange 33 disappears is limited to a small extent.

As described above, a force upwardly pulling the column 1 makes the inner rod portion 32 elongate, and the elongation is distributed from the bottom of the hole 35 at which the inner rod portion 32 is joined to the main body portion 31 to the flange 33. Then, when a larger bending moment is applied after the elongation exceeds the elastic region of the inner rod portion 32, the inner rod portion 32 undergoes plastic deformation over a wide range in the length direction thereof. This ensures that the inner rod portion 32 undergoes a large amount of deformation before final failure.

When a load in the opposite direction is generated after the inner rod portion 32 undergoes plastic deformation as in the case of an earthquake, a compressive stress is applied to the inner rod portion 32 from the joint device 12 via the flange 33 because the upper horizontal plate portion 21 of the joint device 12 is held between the flange 33 and the fastening nut 14 as shown in FIG. 8. In other words, a force that acts to press the inner rod portion 32 into the hole 35 of the main body portion 31 from the flange 33. Then, the inner rod portion 32 undergoes deformation in the compression direction and the end face 31c of the main body portion 31 returns to its original position where it abuts against the flange 33. When the deformation further proceeds, a tensile force is applied to the inner rod portion 32 of the coupling member 11 used on the opposite side of the cross-section of the column 1. When the tensile stress applied to the inner rod portion 32 exceeds its yield point, the inner rod portion 32 undergoes plastic deformation.

In the event of an earthquake, the vibration energy is absorbed and the vibration is attenuated because the inner rod portion 32 repeatedly undergoes plastic deformation as described above. In addition, because the inner rod portion 32, which undergoes plastic deformation, and the main body portion 31, and the inner rod portion 32 and the flange 33 are formed integrally with each other, no looseness develops between them and the energy can be effectively absorbed even when the inner rod portion 32 undergoes plastic deformation. Further, because the inner rod portion 32 and the main body portion 31 are unchangeably joined rigidly to each other, there is no possibility that the joint between them forms an angle and undergoes deformation, in contrast to the case where they are coupled via a so-called pin connection. Thus, because the buckling length based on the shape into which the inner rod portion 32 is deformed when it undergoes the buckling under a compressive force, in other words, the shape into which the inner rod portion 32 is deformed when it swells laterally, can be reduced, the resistance of the inner rod portion 32 against buckling increases.

Figure 9:
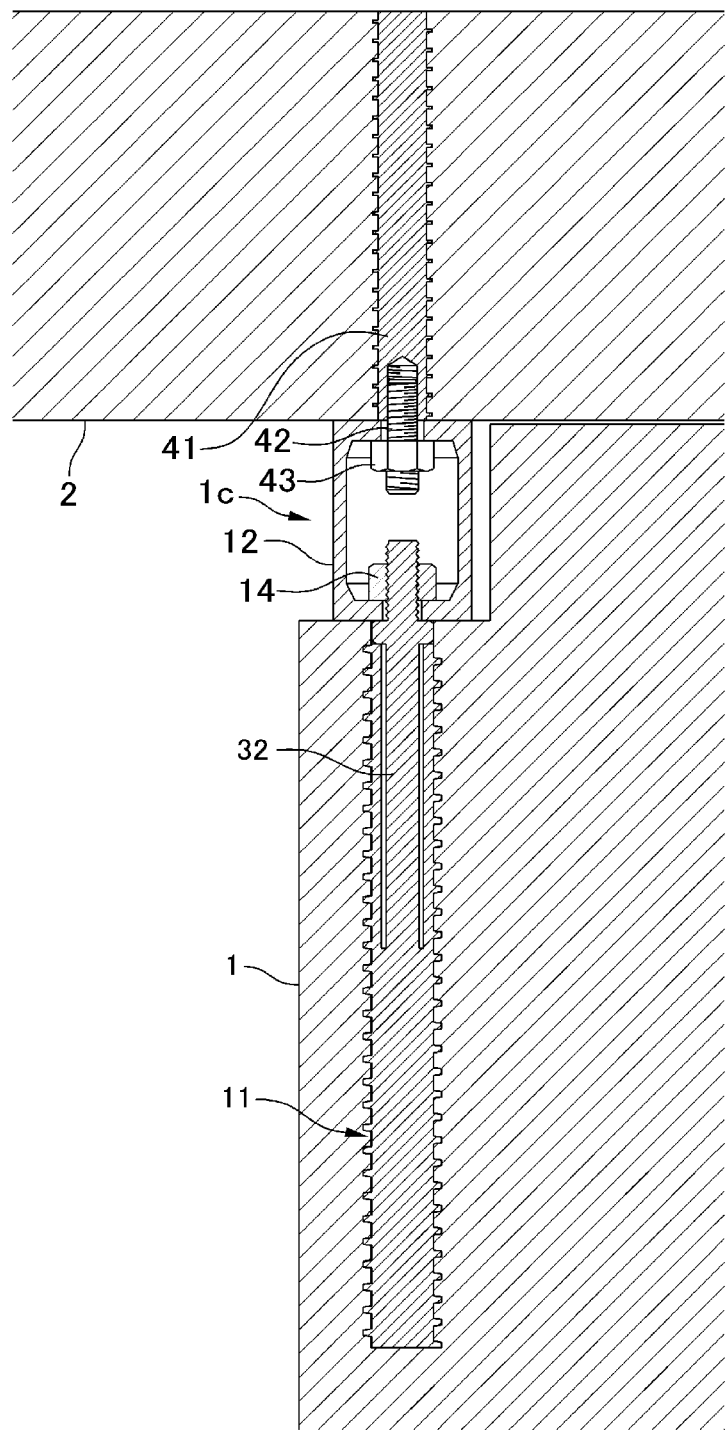
FIG. 9 is a cross-sectional view illustrating an example of a joint between a column and a beam using a coupling member according to the embodiment of present invention.

While the joint structure described above is used to join a wooden column 1 to a foundation 3, the wooden member joint structure using the coupling member 11 according to the embodiment of present invention can be used to join an upper end of a wooden column 1 to a beam 2 as shown in FIG. 9.

In this joint structure, the column 1 has cutouts 1c at both ends in the longer side direction at the upper end thereof, and a coupling member 11 is axially threaded into the column 1 from each cutout 1c. The coupling members 11, the fastening nuts 14 and the joint devices 12 are the same as those used in the joint structure shown in FIG. 3. Thus, these are designated by the same reference numerals, and their description is omitted.

Screw members 41 are vertically threaded into the beam 2 at positions corresponding to the coupling members 11 threaded into the column 1, and each screw member 41 has a screw hole extending axially from an end face thereof. A female thread is formed on the inner periphery of the screw hole, and a headless bolt 42 is threaded into the screw hole. The headless bolt 42 is inserted through the bolt hole of the horizontal plate portion of the joint device 12, and a fastening nut 43 threadedly mounted on the headless bolt 22 is fastened, whereby the joint device 12 is secured to the screw member 41 threaded into the beam 2. The joint device 12 is coupled to the inner rod portion 32 of the coupling member 11 threaded into the column 1 by means of a fastening nut 14, whereby the beam 2 and the column 1 are joined to each other via the screw member 41, the joint device 12 and coupling member 11.

In this joint structure, because the inner rod portion 32 of the coupling member 11 also undergoes plastic deformation when a large tensile force is applied thereto, as in the case where a column 1 and the foundation 3 are joined, the amount of deformation it undergoes before final fracture increases. In addition, a structure that can effectively absorb earthquake energy can be obtained.

The present invention is not limited to the embodiments described above, and may be implemented in a different forms within the scope of the present invention.

For example, the coupling member is not limited to the one produced as shown in FIG. 6A to FIG. 6E, and a coupling member produced as described below may be used.

Figure 10A:
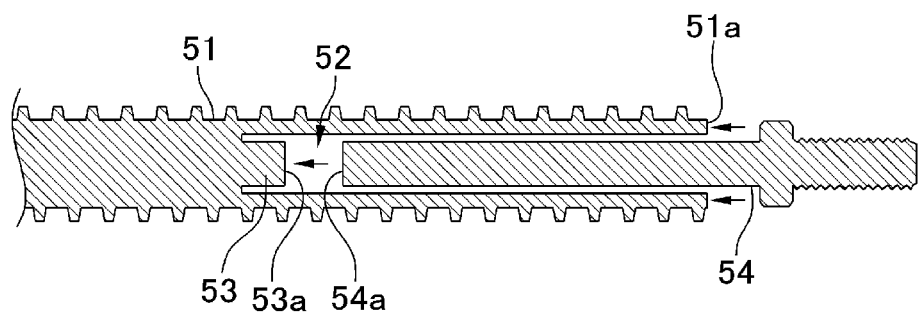
FIG. 10A shows a partial cross-sectional view illustrating a step of another example of a method for producing the coupling member shown in FIG. 5B.
Figure 10B:
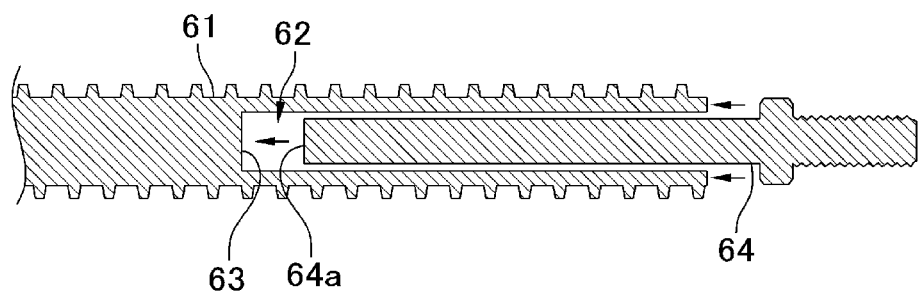
FIG. 10B shows a partial cross-sectional view illustrating a step of another example of a method for producing the coupling member shown in FIG. 5B.
Figure 10C:
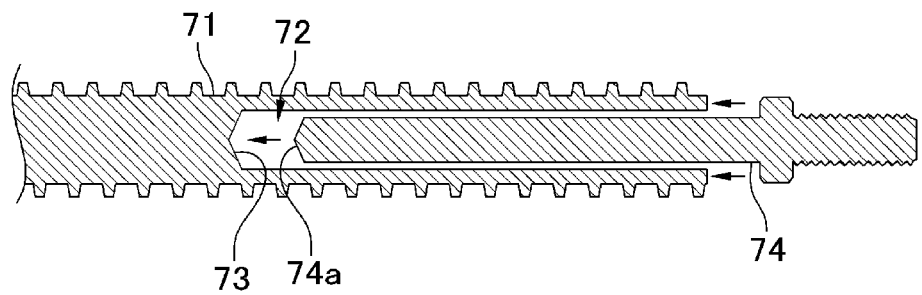
FIG. 10C shows a partial cross-sectional view illustrating a step of another example of a method for producing the coupling member shown in FIG. 5B.

A coupling member produced by joining together by welding a main body portion 51 including a raised portion 53 having a flat tip 53a to be welded to a shaft member 54 and formed when a hole 52 is formed in a main body portion 51 from an end face 51a thereof and the raised portion is provided at the bottom of the hole 52, and a shaft member 54 having a flat tip 54a corresponding in shape to the tip 53a may be used as shown in FIG. 10A. Alternatively, a flat bottom face 63 may be formed without forming a raised portion on the bottom of a hole 62 when the hole 62 is formed in a main body portion 61 and a tip 64a of a shaft member 64 may be welded to the bottom face 63 as shown in FIG. 10B. Alternatively, when no raised portion is formed on the bottom of a hole 72 formed in a main body portion 71, a concave conical surface formed in a bottom face 73 of the hole 72 and a convex conical surface formed on a tip 74a of a shaft member 74 may be welded face to face together as shown in FIG. 10C.

Figure 11A:
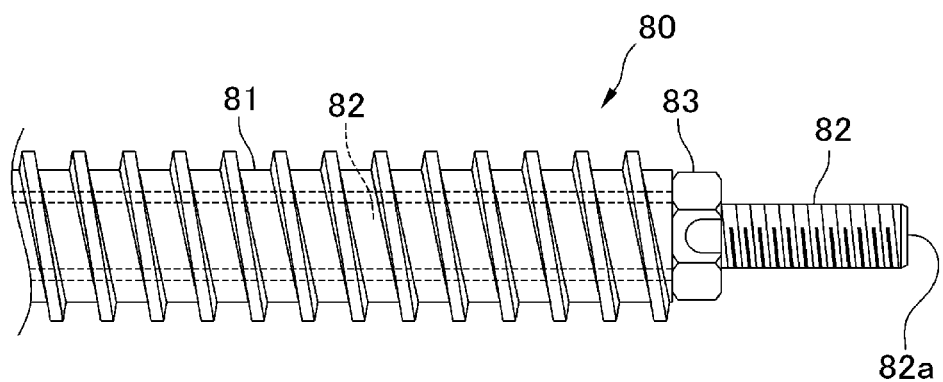
FIG. 11A shows a partial side view illustrating another example of a coupling member that can be used in the joint structure shown in FIG. 2 and FIG. 3.
Figure 11B:
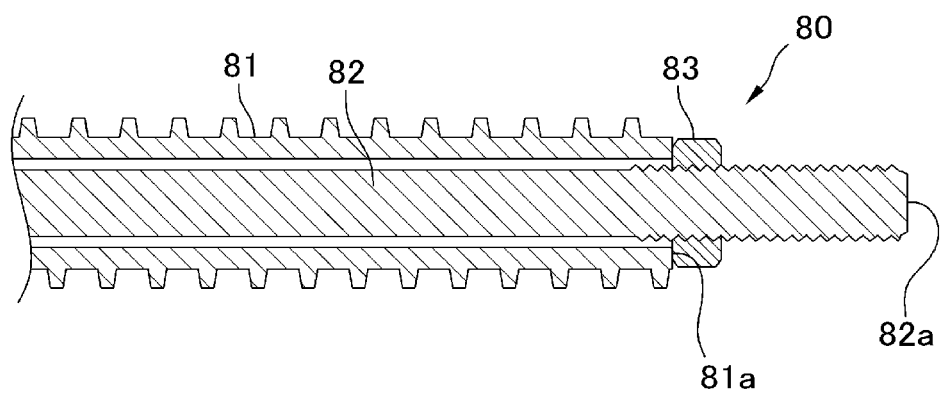
FIG. 11B shows a partial cross-sectional view illustrating another example of a coupling member shown in FIG. 11A that can be used in the joint structure shown in FIG. 2 and FIG. 3.

On the other hand, while the flange is formed integrally with the inner rod portion in the case of the coupling members shown in FIG. 6A to FIG. 6E and FIG. 10A to FIG. 10C, a nut 83 threadedly engaged with a male thread formed on an inner rod portion 82 may be used as the flange as shown in FIG. 11A and FIG. 11B. In the case of this coupling member 80, a male thread is formed on the inner rod portion 82 from a tip 82a protruding from the main body portion 81 to a part located in the hole formed in the main body portion 81. To use the coupling member 80, a nut 83 threadedly engaged with the male thread is tightened until it abuts against an end face 81a of the main body portion before it is threaded into a column as a wooden member.

When a nut threadedly mounted on the inner rod portion is used as a flange as described above, the coupling member may be formed as described below.

Figure 12A:
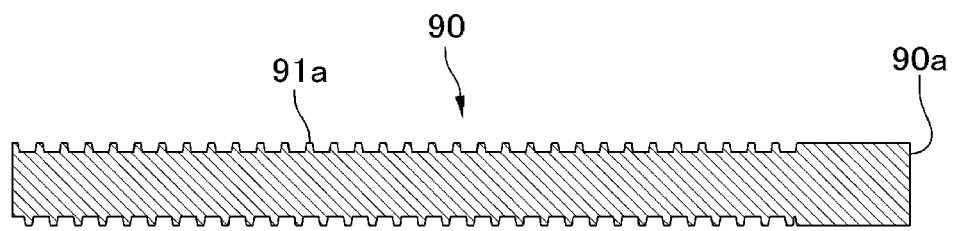
FIG. 12A shows a schematic cross-sectional view illustrating a step of another example of a method for producing the coupling member as shown in FIG. 11B.
Figure 12B:
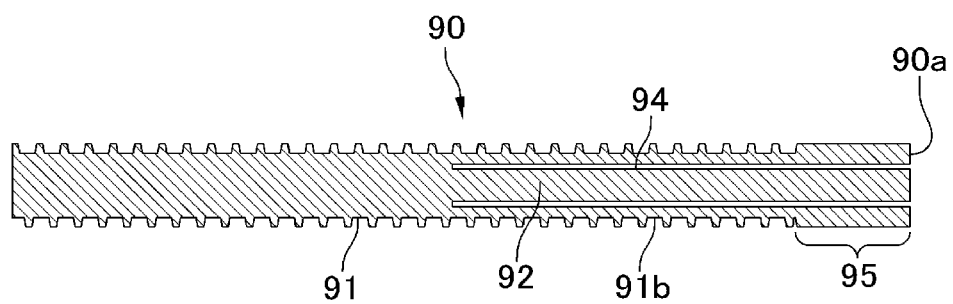
FIG. 12B shows a schematic cross-sectional view illustrating a step of another example of a method for producing the coupling member as shown in FIG. 11B.
Figure 12C:
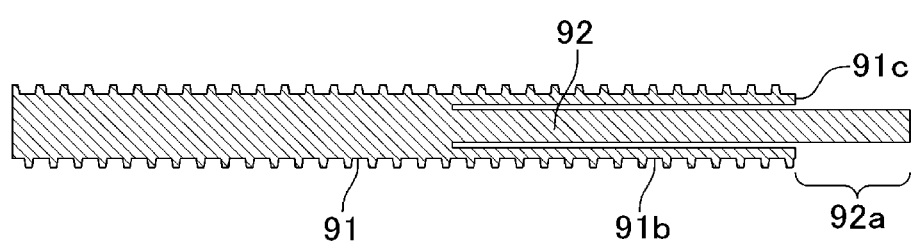
FIG. 12C shows a schematic cross-sectional view illustrating a step of another example of a method for producing the coupling member as shown in FIG. 11B.
Figure 12D:
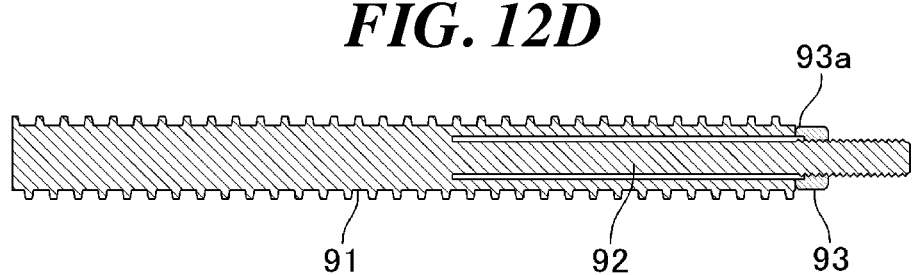
FIG. 12D shows a schematic cross-sectional view illustrating a step of another example of a method for producing the coupling member as shown in FIG. 11B.

As shown in FIG. 12A, a rod-like steel member 90 which is longer than the main body portion that will be eventually obtained is prepared, and a spiral protrusion 91a is formed by cutting or machining on an outer periphery of the portion thereof that will be the main body portion. Then, as shown in FIG. 12B, a groove is annularly formed from an end face 90a with a hole saw or the like to form an annular gap 94 extending to a predetermined depth. As a result, an inner rod portion 92 having a predetermined diameter and separated from a circumferential portion 91b of the main body portion by the gap 94 is formed within the annular gap 94. After that, the circumferential portion is cut off at a predetermined length 95 from the end face from which the annular gap 94 extends so that the inner rod portion 92 can protrudes from a main body portion 91 having a spiral protrusion. A male thread is formed on a portion 92a of the inner rod portion 92 protruding from the main body portion 91 by a method such as rolling. The male thread cannot be formed on the portion surrounded by the circumferential portion 91b of the main body portion 91, in other words, in the hole of the main body portion 91. Thus, a nut which has an extended portion 93a having an inside diameter that is larger than the outside diameter of the inner rod portion 92 and extending from the portion with a female thread toward the end face of the main body portion 91 as shown in FIG. 12D may be preferably used as the nut 93 that is threadedly engaged with the male thread to form a flange. The extended portion 93a surrounds the inner rod portion 92 with a clearance therebetween and can be therefore brought into contact with the end face 91c of the main body portion 91.

Figure 13:
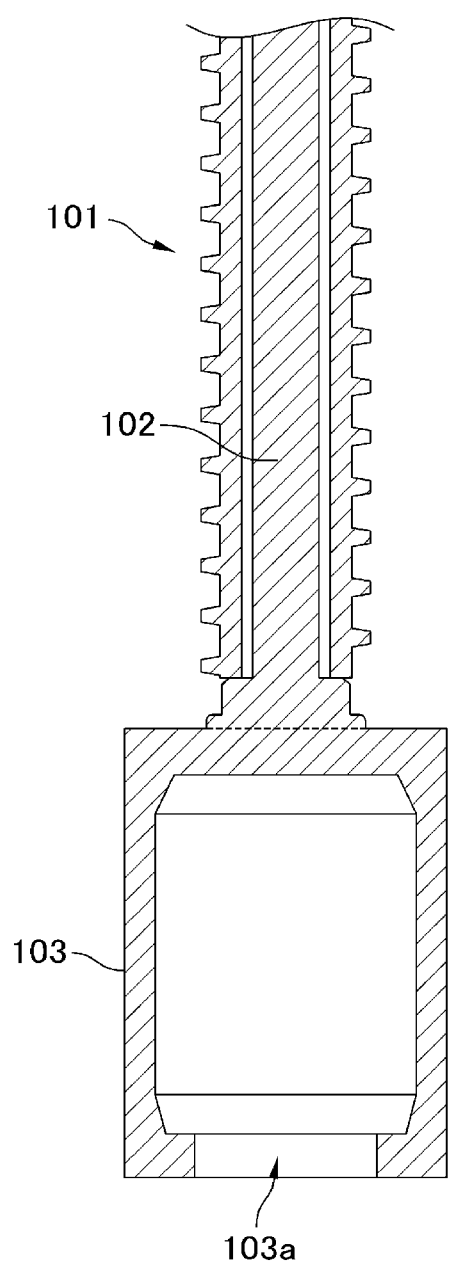
FIG. 13 is a partial cross-sectional view illustrating another embodiment of a coupling member according to the present invention.

While the joint device 12 is joined to the inner rod portion 32 of the coupling member 11 by means of the fastening nut 14 in the embodiments described above, a joint device 103 may be integrally welded to an inner rod portion 102 of a coupling member 101 as shown in FIG. 13. When the coupling member 101 and the joint device 103 are used, the coupling member 101 is threaded into a hole formed axially in a column after being integrally joined to the joint device 103. Then, when an anchor bolt or a joining bolt is inserted through a bolt hole of the joint device 103 when or after the column is erected at a predetermined position, the joint device 103 can be joined to the foundation or a beam.

Figure 14:
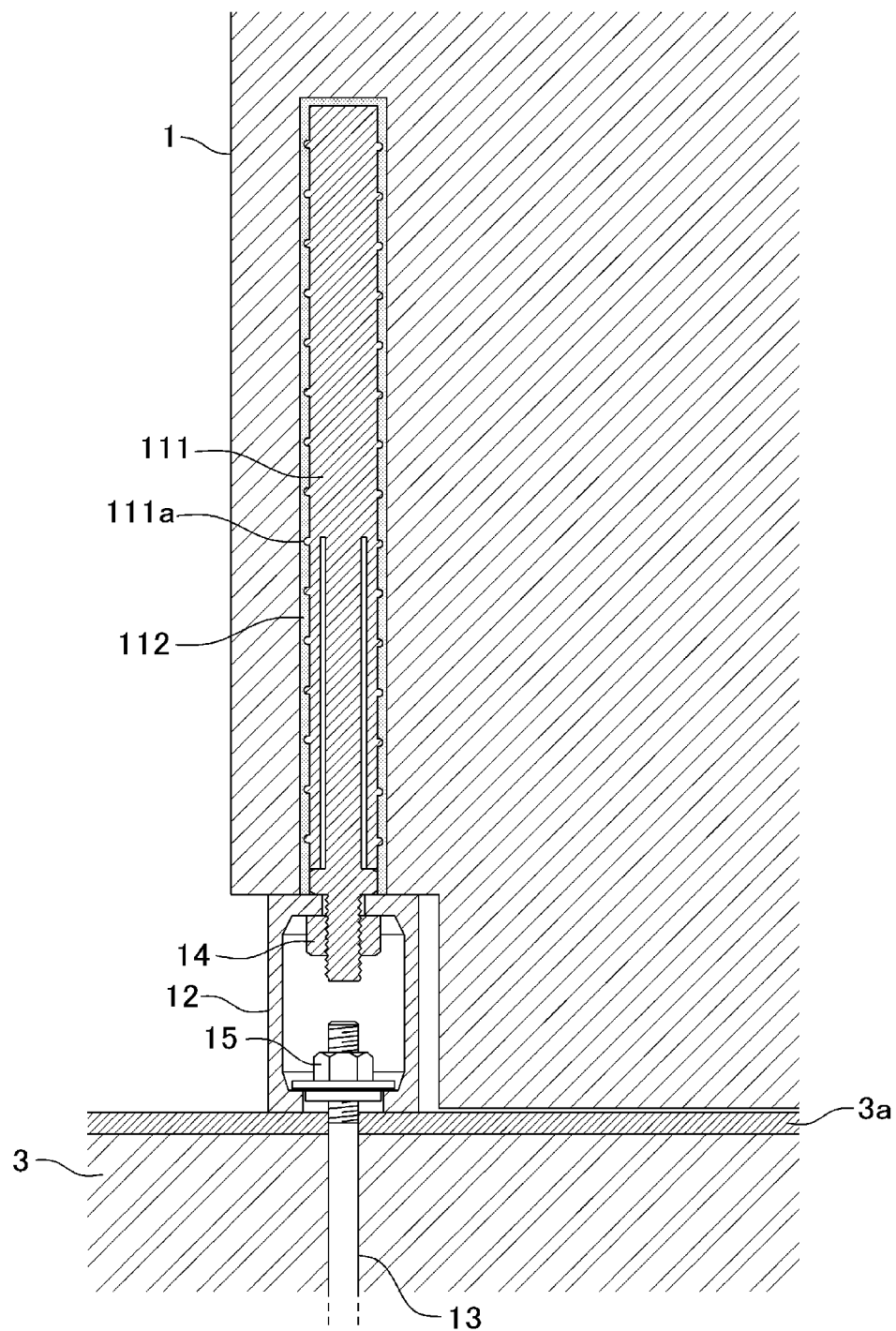
FIG. 14 is a cross-sectional view illustrating a wooden member joint structure using another example of a coupling member according to the embodiment of present invention.
Figure 15:
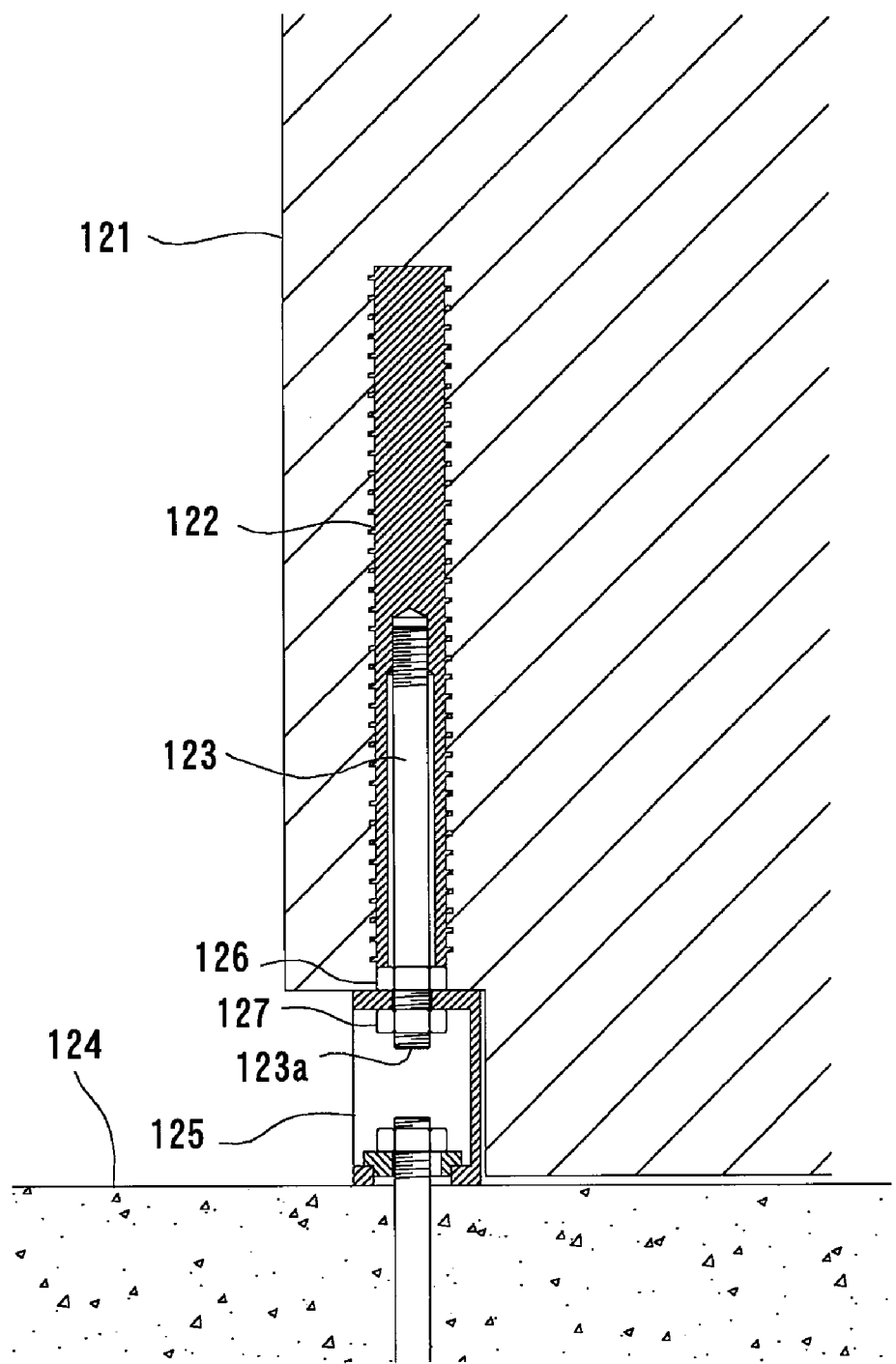
FIG. 15 is a schematic cross-sectional view illustrating a wooden member joint structure using a conventional coupling member.

In the embodiments described above, the main body portion 31 of the coupling member 11 has a spiral protrusion 31a on an outer periphery thereof. Thus, when the main body portion 31 is threaded into a hole formed in a column 1 as a wooden member, the coupling member 11 is fixed because the spiral protrusion 31a is engaged with the wooden member. As shown in FIG. 14, a synthetic resin 112 may be filled in the gap between the inner periphery of the hole and the outer periphery of a main body portion 111 after the main body portion 111 is inserted into a hole formed in the column 1 as a wooden member to bond the main body portion 111 firmly to the column Δt this time, the main body portion 111 preferably has an outer periphery having protrusions or recesses or a roughened outer periphery in order to prevent the main body portion from sliding out of the hole. In the example shown in FIG. 14, ridge-like protrusions 111a are provided on the outer periphery of the main body portion 111.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising", having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS

1: column, 1a, 1c: cutout, 2: beam, 3: foundation, 4: rigid-frame body, 11: coupling member, 12: joint device, 13: anchor bolt, 14: fastening nut, 15: nut, 21: upper horizontal plate portion of joint device, 22: lower horizontal plate portion of joint device, 23: side plate portion of joint device, 24: through hole, 25: circular hole, 26: circular plate, 27: slot, 31: main body portion of coupling member, 31a: spiral protrusion, 31b: circumferential portion of main body portion, 31c: end face of main body portion from which inner rod portion protrudes, 32: inner rod portion of coupling member, 32a: male thread portion, 33: flange of coupling member, 33a: cutout, 33b: face of flange from which inner rod portion protrudes, 34: annular gap, 35: hole, 36: annular groove, 37: raised portion, 38: shaft member that will be inner rod portion, 41: screw member for beam, 42: headless bolt, 43: fastening nut, 51, 61, 71: main body portion, 52, 62, 72: hole, 53: raised portion, 54, 64, 74: shaft member, 63, 73: bottom face of hole, 80: coupling member, 81: main body portion, 82: inner rod portion, 83: nut that will be flange, 90: steel member, 91: main body portion, 92: inner rod portion, 93: nut, 94: annular gap, 101: coupling member, 102: inner rod portion, 103: joint device, 111: main body portion, 111a: ridge-like protrusion, 112: synthetic resin

What is claimed is:

1. A coupling member, comprising:
   a metal rod-shaped main body portion to be embedded and held in a wooden member; and
   an inner rod portion protruding from an end face of the main body portion and to be coupled to a mating member, the mating member to be joined to the wooden member or the inner rod portion to be coupled to a joint device secured to the mating member,
   wherein the inner rod portion axially extends from a portion protruding from the end face of the main body portion to a predetermined depth in a hole axially extending in the main body portion from a first open end to an opposing second end that is a deepest part of the hole, has a periphery separated from the main body portion so as to form an annular gap between the inner rod portion and the main body portion to allow axial deformation of the inner rod portion relative to the main body portion, and is integrally connected to the main body portion at the deepest part of the hole extending in the main body portion.

2. The coupling member according to claim 1, wherein a connecting portion is at the second end of the hole, the connecting portion integrally connecting the inner rod portion to the main body portion.

3. The coupling member according to claim 2,
   wherein a raised portion protruding axially from the deepest part of the hole toward an opening of the hole and separated from the inner periphery of the hole is formed, and
   wherein the inner rod portion is formed by connecting a tip of a shaft member and the raised portion by welding, the shaft member being inserted in the hole.

4. The coupling member according to claim 1, wherein the inner rod portion has a flange formed integrally with the protruding portion thereof, the flange extending perpendicular to an axis of the inner rod portion.

5. The coupling member according to claim 4,
   wherein a connecting portion is at the second end of the hole, the connecting portion integrally connecting the inner rod portion to the main body portion, and
   wherein the flange is in pressure contact with the end face of the main body portion.

6. The coupling member according to claim 5,
   wherein a raised portion protruding axially from the deepest part of the hole toward an opening of the hole and separated from the inner periphery of the hole is formed, and
   wherein the inner rod portion is formed by connecting a tip of a shaft member and the raised portion by welding, the shaft member being inserted in the hole.

7. A wooden member joint structure, comprising:
   a coupling member, comprising:
      a metal rod-shaped main body portion to be embedded and held in a wooden member; and
      an inner rod portion protruding from an end face of the main body portion and to be coupled to a mating member, the mating member to be joined to the wooden member or the inner rod portion to be coupled to a joint device secured to the mating member,
   the wooden member in which the coupling member is fixedly embedded; and
   the mating member joined to the wooden member by the coupling member,
   wherein the inner rod portion axially extends from a portion thereof protruding from the end face of the main body portion to a predetermined depth in a hole extending in the main body portion from a first open end to an opposing second end that is the deepest part of the hole, has a periphery separated from the main body portion so as to form an annular gap between the inner rod portion and the main body portion to allow axial deformation of the inner rod portion relative to the main body portion, and is integrally connected to the main body portion at the deepest part of the hole extending in the main body portion.

8. The wooden member joint structure according to claim 7, wherein a connecting portion is at the second end of the hole, the connecting portion integrally connecting the inner rod portion to the main body portion.

9. The wooden member joint structure according to claim 7, wherein the inner rod portion has a flange formed integrally with the protruding portion thereof, the flange extending perpendicular to an axis of the inner rod portion.

* * * * *